Figure 1:
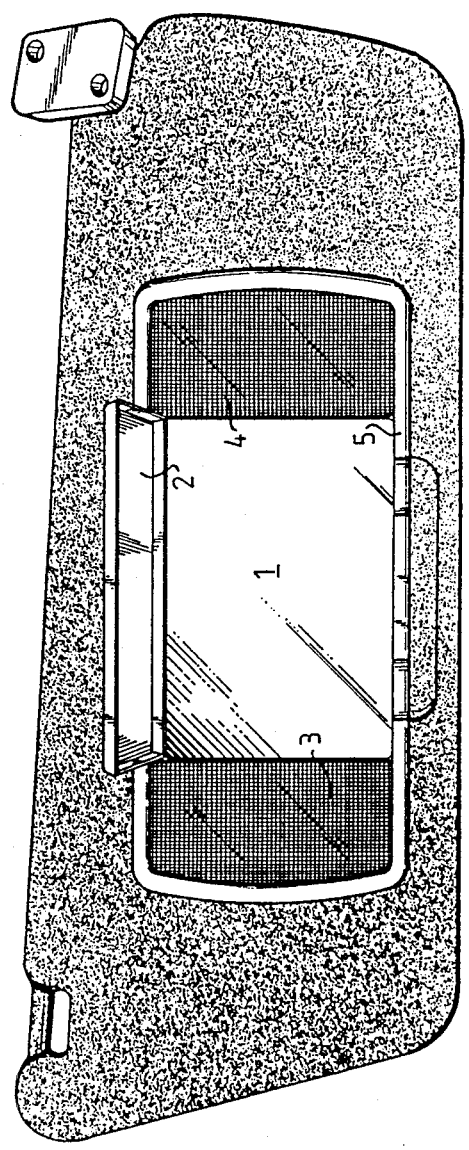

United States Patent [19]

Svensson

[11] Patent Number: 4,830,424
[45] Date of Patent: May 16, 1989

[54] SUN VISOR WITH MIRROR LIGHTING AND PIVOTED COVER

[75] Inventor: E. Gunnar Svensson, Dammgatan, Sweden

[73] Assignee: Autopart Sweden AB, Malung, Sweden

[21] Appl. No.: 116,335

[22] Filed: Nov. 3, 1987

[30] Foreign Application Priority Data

Nov. 20, 1986 [SE] Sweden ............................... 8604967

[51] Int. Cl.⁴ ............................. B60J 3/02; B60Q 3/02
[52] U.S. Cl. .................................. 296/97.1; 296/97.5; 362/80; 362/144
[58] Field of Search ................ 296/97 R, 97 C, 97 H; 362/744, 80; 132/301, 288, 291

[56] References Cited

U.S. PATENT DOCUMENTS

| | | | |
|---|---|---|---|
| 3,375,364 | 3/1968 | Marcus | 296/97 R X |
| 4,075,468 | 2/1978 | Marcus | 296/97 H X |
| 4,227,241 | 10/1980 | Marcus | 296/97 H X |
| 4,421,355 | 12/1983 | Marcus | 296/97 H X |
| 4,655,498 | 4/1987 | Panzner et al. | 296/97 H |
| 4,734,955 | 4/1988 | Connor | 296/97 H X |
| 4,760,503 | 7/1988 | VandenBerge et al. | 362/80 X |

FOREIGN PATENT DOCUMENTS

| | | | |
|---|---|---|---|
| 0023536 | 2/1981 | European Pat. Off. | |
| 0197749 | 10/1986 | European Pat. Off. | 296/97 C |
| 3222194 | 12/1983 | Fed. Rep. of Germany | 296/97 C |
| 3427952 | 1/1986 | Fed. Rep. of Germany | 296/97 H |

Primary Examiner—Andres Kashnikow
Assistant Examiner—Richard Potosnak
Attorney, Agent, or Firm—Young & Thompson

[57] ABSTRACT

The present invention relates to a vehicle sun visor comprising a lighted mirror and at least one pivoted cover which in its closed position covers at least a portion of the mirror. According to the invention, the cover is pivotally supported by the diffuser plates, which are included in the mirror lighting. This makes it possible to easily remove the diffuser plates by using the cover as a handle to snap the diffuser plates out of engagement with the walls of the cavities in which the diffuser plates are held.

6 Claims, 2 Drawing Sheets

SUN VISOR WITH MIRROR LIGHTING AND PIVOTED COVER

The present invention relates to a vehicle sun visor, comprising a lighted mirror and at least one swingable cover which when closed covers at least a part of the mirror.

In such sun visors, the lighting diffuser plates or lenses are usually snapped into cavities in a mirror cassette or the like. In such cases it is often difficult without tools to remove the diffusers, on one hand, because the relatively small dimensions thereof make it necessary to have small dimensions in the depressions in the diffusers and cassettes and, on the other hand, because the snap engagement of the diffusers in their cavities is usually quite strong.

The purpose of the present invention is to provide a sun visor of the above-mentioned type, in which the diffuser plates can be easily removed without tools at the same time as a suitable bearing for the pivoted cover is provided.

This purpose is achieved by means of a sun visor in which the cover functions as a handle when removing one whereby it will be possible to remove it without the aid of tools despite relatively great engagement forces.

Figure 2:
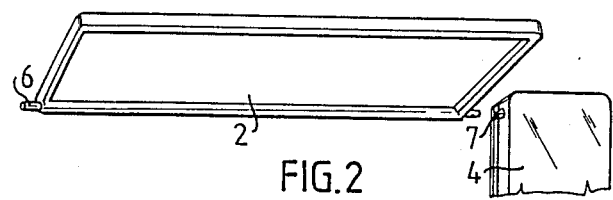
Figure 3:
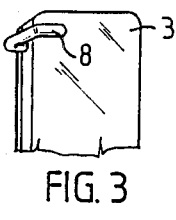
Figure 4:
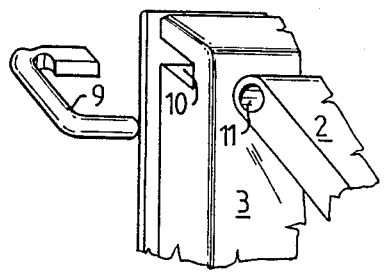
Figure 5:
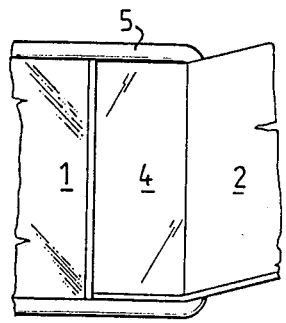

These and other characteristics and advantages will be evident from the following detailed description of a preferred embodiment of the invention with reference to the accompanying drawings, of which:

FIG. 1 shows a perspective frontal view of a sun visor according to the invention, FIG. 2 shows the pivoted cover and the right-hand diffuser from FIG. 1 in their disassembled state, FIG. 3 shows a variant of a diffuser according to the invention, FIG. 4 shows another variant of the bearing for a cover in a sun visor according to the invention, and FIG. 5 shows still another variant of the invention, in which the cover is supported by a single diffuser.

The sun visor shown in FIG. 1 comprises a mirror unit with a mirror 1, a cover 2, two diffuser plates or lenses 3, 4, which spread the light from lamps (not shown), and a frame 5. The diffusers 3, 4 are inserted into cavities in a mirror cassette or mirror plate, in which the diffusers are held by clamping force, preferably a snap connection.

FIG. 2 shows the cover 2 and a portion of the diffuser 4 disassembled. It is evident from this figure that the cover has projecting pins 6, which can be inserted into holes 7 in the side walls of the diffuser plates 3, 4. The cover is also disposed in a suitable manner to remain in the completely open or completely closed positions. This can be achieved quite simply by making cooperating projections and cavities in the sidewalls of the cover and diffuser plates or in the pins 6 and holes 7, or by making the connection between the pin and hole as a spring cam connection, so that the cover is urged by a spring towards the completely open or completely closed position on either side of an unstable intermediate position. The mounting of the mirror units shown in FIGS. 1 and 2 is done most simply by one of the diffuser plates 3, 4 being pressed into its cavity, whereafter the corresponding pin 6 of the cover 2 is inserted into the corresponding holes 7. Thereafter the hole in the remaining diffuser plate is slipped over the remaining free pin of the cover and the diffuser plate is pressed into its cavity.

If the cover must be mounted without play so that the above described simple assembly process is not possible, the two diffuser plates can be slipped onto the pins prior to the diffuser plates being completely snapped into their cavities.

In FIGS. 1 and 2, the cover is arranged between the diffuser plates and only covers the mirror surface itself. It is however possible to use the invention for covers which cover both the diffusers and the mirror surface and FIGS. 3 and 4 show two embodiments in such an application.

The pins 8 supporting the cover, in the variant shown in FIG. 3, are made in one piece with the diffuser plate 3 and are arranged so that the cover can extend over the diffuser plates and also cover them when the cover is in its closed position.

The variant shown in FIG. 4 differs from the variant shown in FIG. 3 in that the pin co-operating with the hole 11 in the cover 2 is one leg of a U-shaped hinge portion 9, the other leg of which has a rectangular cross-section for fitting into a cavity 10 in the diffuser plate 3. It will be seen that by providing the circle-cylindrical leg co-operating with the hole 11 with projections and said hole with suitable grooves a suitable friction can be obtained when swinging the cover and that rest positions will be obtained in which the projection or projections co-operate with the groove or grooves.

FIG. 5 shows a variant in which the cover 2 is pivoted in a single diffuser plate 4. In this case, the pivot means can suitably consist of pins integrated with the diffuser plate, co-operating with a circular pair of flanges on the cover 2, which when the cover is closed can be snapped onto said pins.

By virtue of the fact that the cover is connected to the diffuser plates in the manner described above, they can easily be removed by grasping the cover when opened and pulling it outwards to thereby release the snap engagement between the diffuser plates and their cavity walls. The diffuser plates can thus be simply removed without using tools.

The invention thus provides a lighted mirror unit for a sun visor, which is easy to manufacture, assemble and disassemble and which also provides a simple assembly of a pivoted cover.

A number of modifications of the embodiments shown are of course conceivable within the scope of invention, for instance as regards shape, placement and configuration of the pins, the shaft components, cover and diffuser plates. The scope of the invention is thus only limited by the scope of the accompanying claims.

I claim:

1. In a vehicle sun visor comprising a lighted mirror, at least one pivoted cover which when closed covers at least a portion of the mirror, at least one lamp and a lens covering each said at least one lamp, said lens being releasably secured to the sun visor by clamping force; the improvement comprising means pivotably supporting the cover on and for swinging movement relative to said lens, whereby a pull on said cover overcomes said clamping force to separate the lens from the lamp and mirror.

2. Structure as claimed in claim 1, said supporting means comprising pin means carried by one of said cover and lens.

3. Structure as claimed in claim 1, there being a said lens on each side of said cover, said cover being supported on and between said lenses.

4. Structure as claimed in claim 3, said supporting means comprising two pivot pins protruding from opposite sides of said cover for mounting said cover for vertical swinging movement on two said lenses about a horizontal axis, each said pin being disposed in a hole in a said lens.

5. Structure as claimed in claim 1, said cover being supported by a single lens.

6. Structure as claimed in claim 1, said pivotable supporting means comprising a U-shaped shaft portion having ends disposed in openings in the cover and in said lens.

* * * * *